(12) United States Patent
Fritz et al.

(10) Patent No.: US 9,005,327 B2
(45) Date of Patent: Apr. 14, 2015

(54) APPARATUS, METHOD AND SYSTEM FOR RECEIVING AND/OR DISCHARGING MEDIUM FOR DISPOSAL

(75) Inventors: Hans-Georg Fritz, Ostfildern (DE); Marcus Kleiner, Ingersheim (DE); Michael Zabel, Winnenden (DE); Benjamin Wöhr, Eibensbach (DE); Georg M. Sommer, Ludwigsburg (DE); Dietmar Wieland, Hohenacker (DE); Wolfgang Tobisch, Stuttgart (DE)

(73) Assignee: Durr Systems GmbH, Bietigheim-Bissigen (DE)

( * ) Notice: Subject to any disclaimer, the term of this patent is extended or adjusted under 35 U.S.C. 154(b) by 4 days.

(21) Appl. No.: 13/699,862

(22) PCT Filed: Jun. 1, 2011

(86) PCT No.: PCT/EP2011/002727
§ 371 (c)(1),
(2), (4) Date: Jan. 9, 2013

(87) PCT Pub. No.: WO2011/151072
PCT Pub. Date: Dec. 8, 2011

(65) Prior Publication Data
US 2013/0152521 A1    Jun. 20, 2013

(30) Foreign Application Priority Data
Jun. 1, 2010   (DE) .......................... 10 2010 022 309

(51) Int. Cl.
*B01D 39/00* (2006.01)
*B01D 45/04* (2006.01)
(Continued)

(52) U.S. Cl.
CPC .............. *B01D 45/04* (2013.01); *B05B 15/025* (2013.01); *B05B 15/1225* (2013.01);
(Continued)

(58) Field of Classification Search
USPC ........... 55/391, 430, 428, 418, 423, 421, 466, 55/DIG. 46, 431; 118/602, 603, 610, 326
See application file for complete search history.

(56) References Cited

U.S. PATENT DOCUMENTS 3,168,030 A * 2/1965 Arborgh et al. ................. 454/52
4,785,760 A * 11/1988 Tholome ....................... 118/323
(Continued)

FOREIGN PATENT DOCUMENTS

DE    3933745 A1    4/1991
DE    4129778 A1    7/1992
(Continued)

OTHER PUBLICATIONS

European Patent Office, International Search Report, PCT/EP2011/002727, Jul. 28, 2011, 9 pages (with English translation).

*Primary Examiner* — Dung H Bui
(74) *Attorney, Agent, or Firm* — Bejin Bieneman PLC

(57) ABSTRACT

A device for receiving and/or discharging a disposal medium from cleaning and/or rinsing processes of an application apparatus can comprise a separation equipment which is provided to receive the disposal medium discharged by the application device and to subject the disposal medium to a separation. The device can also comprise a receiving equipment which is provided to receive a disposal medium and a suction device which is provided to suction and/or suction off at least a part of the disposal medium led to or into the receiving equipment.

18 Claims, 6 Drawing Sheets

Figure 1A:
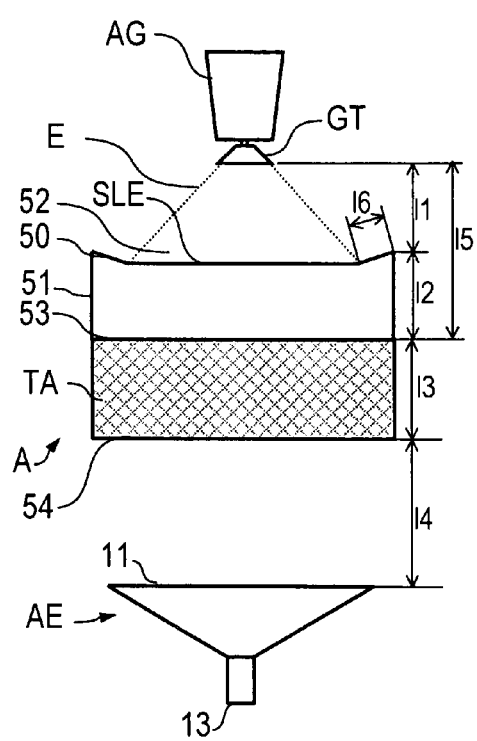

(51) Int. Cl.
  *B05B 15/02* (2006.01)
  *B05B 15/12* (2006.01)
  *B08B 3/02* (2006.01)
  *B05B 5/04* (2006.01)
  *B05B 13/04* (2006.01)

(52) U.S. Cl.
  CPC *B08B 3/022* (2013.01); *B05B 5/04* (2013.01); *B05B 13/0452* (2013.01); *B05B 15/0258* (2013.01); *Y10S 55/46* (2013.01)

(56) References Cited

U.S. PATENT DOCUMENTS

| | | | |
|---|---|---|---|
| 5,122,192 A | 6/1992 | Inukai et al. | |
| 5,693,150 A | 12/1997 | Powell | |
| 5,772,125 A | 6/1998 | Ehinger et al. | |
| 6,833,016 B2 * | 12/2004 | Witter | 55/337 |
| 7,721,745 B2 | 5/2010 | Baumann et al. | |
| 2002/0157604 A1 * | 10/2002 | Ainsworth et al. | 118/326 |
| 2008/0011333 A1 | 1/2008 | Rodgers | |
| 2008/0149026 A1 | 6/2008 | Cedoz | |
| 2010/0050870 A1 * | 3/2010 | Gajjar et al. | 95/273 |
| 2010/0199912 A1 * | 8/2010 | Holzheimer et al. | 118/326 |
| 2011/0189402 A1 * | 8/2011 | Wagner | 427/345 |

FOREIGN PATENT DOCUMENTS

| | | |
|---|---|---|
| DE | 68927035 T2 | 1/1997 |
| DE | 68927035 T2 | 1/1997 |
| DE | 69429088 T2 | 7/2002 |
| DE | 69429088 T2 | 7/2002 |
| DE | 10109574 A1 | 9/2002 |
| DE | 10110098 A1 | 9/2002 |
| DE | 10110098 A1 | 9/2002 |
| DE | 10240073 A1 | 12/2003 |
| DE | 102004061322 A1 | 6/2006 |
| DE | 102004061322 A1 | 6/2006 |
| EP | 2140947 A1 | 1/2010 |
| EP | 2140947 A1 | 1/2010 |
| WO | WO2011057787 A1 | 5/2011 |
| WO | WO-2011057787 A1 | 5/2011 |

* cited by examiner

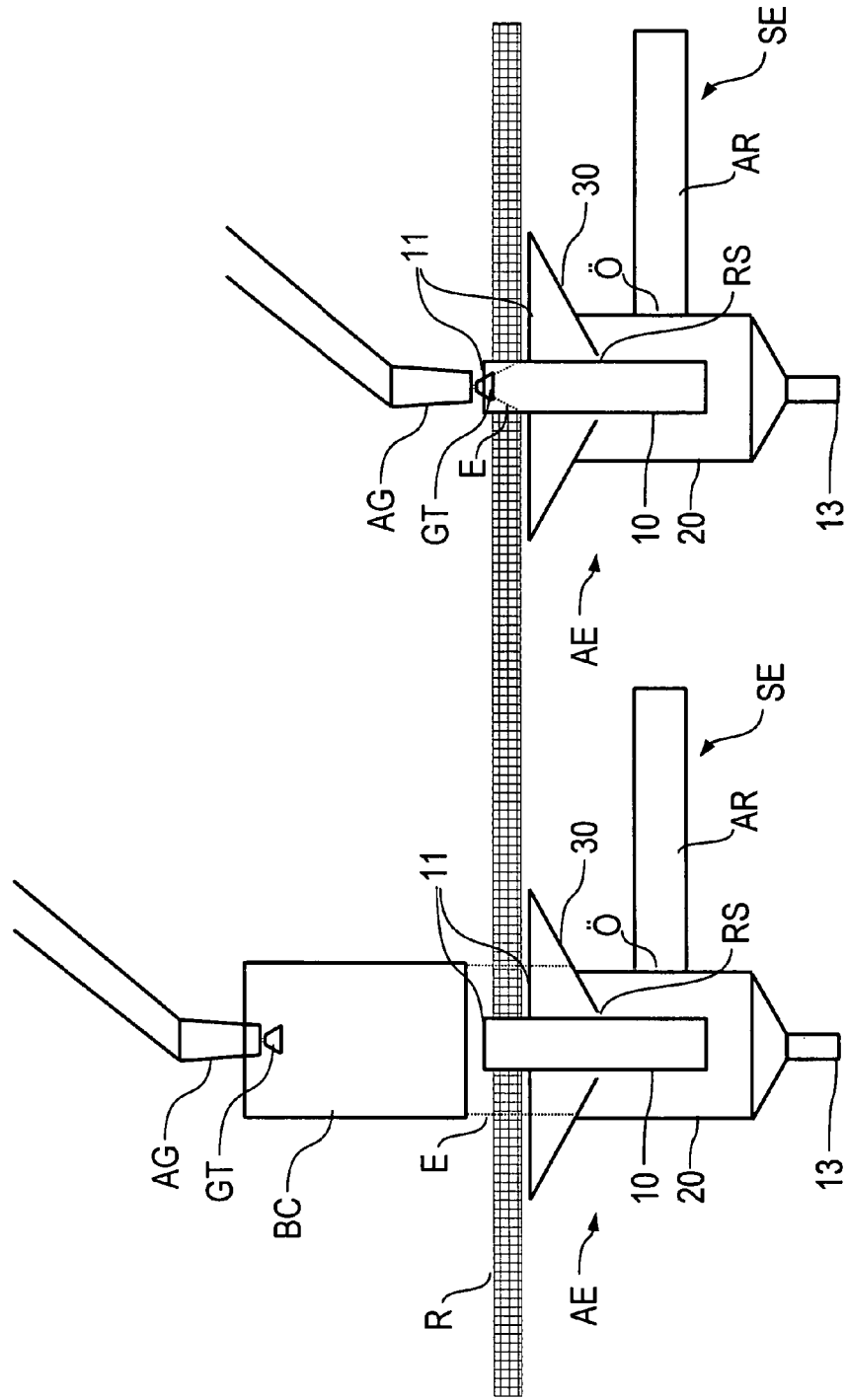

APPARATUS, METHOD AND SYSTEM FOR RECEIVING AND/OR DISCHARGING MEDIUM FOR DISPOSAL

This application claims priority to PCT Application No. PCT/EP2011/002727, filed Jun. 1, 2011, and hence to the application to which the foregoing PCT application claims priority, German application DE 10 2010 022 309.3, filed Jun. 1, 2010; this application hereby incorporates by reference all of each of said applications in their entireties.

The invention relates to a device, a method and a system for receiving or collecting and/or discharging or disposing of disposal mediums. The invention is in particular used in a coating installation, preferably in a painting installation for vehicles, motor vehicle body parts, etc. and/or for disposal of media from cleaning and/or rinsing processes of application apparatuses, atomizers, paint changers, return lines or other application technology components.

Application apparatuses such as atomizers, paint changers etc. for coating motor vehicle body parts must be cleaned or rinsed at regular intervals. Rinsing can be necessary to prevent deposition of coating agents, e.g. of paint, in the application apparatus, which could otherwise lead to malfunction of the application apparatus. Rinsing can also be necessary for a paint change to prevent paint residues of the wrong colour contaminating the paint to be applied, which can lead to a loss in quality of the part to be coated or even make it unusable.

One part of the rinsing agent to be used (for solvent-based paints these are mostly organic solvents, for water-based paints mostly demineralized water with low concentrations (about 5-10%) of butyl glycol) is preferably led away internally non-atomized via return lines, but one part is atomized via the application apparatus, for example the bell or the bell cup of an atomizer.

The rinsing agent atomized over the bell cup has, until now, mostly been atomized in the cabin air of the painting cabin and therefore led to the exhaust air stream, which has the negative effect that the emissions are increased.

The rinsing also took place, in part, in special cleaning devices or apparatuses (e.g. bell cleaning devices) such as those known from DE 10 2004 061 322 A1 and DE 102 40 073 A1.

It has previously been the case that the organic components of the rinsing agent appeared to a great degree as emissions as well as on the exhaust side and in the waste water (when using wet wash-outs).

It order to either reduce the emissions occurring through the rinsing agent, or preferably to avoid them altogether, it is preferable to be able to catch as high a proportion of the rinsing agent (paint) mixture as possible and to dispose of it separately.

The rinsing can occur, where applicable, inside when there is a bell cleaning device available. This is only possible, however, if the cycle time is long enough. There is an increase through this in the time required for rinsing, due amongst other things to the powering down and powering up of the high voltage. Furthermore, the targeted moving in and moving out in a bell cleaning device is also associated with an increase in the time required. It is also possible that the rinsing into a bell cleaning device can lead to subsequent problems (a build-up of moisture or paint in the bell area), which reduces the whole cleaning performance of the system.

For some designs of paint mist separation systems the continuous addition of rinsing media into the separation fluid can lead to impairment of the functionality.

For some designs of paint mist separation systems, continuous addition of rinsing media into the separation fluid can lead to an unpleasant and undesirable formation of puddles (in particular for use of primarily aqueous rinsing media) or the operating costs of the system increase due to the influence on the change cycles of auxiliary materials.

In the light of the above explanations it is clear to the persons skilled in the art on the basis of this disclosure that there is a requirement to solve or overcome the above described problems or disadvantages. This invention relates to this requirement of the prior art and to other requirements, which are revealed to persons skilled in the art based on this disclosure.

The objects arising from the aforementioned can be achieved in principle with the features of the independent claims. The invention is not limited, however, to embodiments that remedy all of the problems or disadvantages of the prior art cited at the outset. The invention also claims general protection for the exemplary embodiments described below.

According to the invention there is a device provided for receiving or collecting and/or discharging or disposing of disposal mediums from cleaning and/or rinsing processes of an application apparatus, preferably for coating resp. painting vehicles, motor vehicle body parts, their add-on parts (for example fenders, mirror housings, fender strip), etc.

The device comprises, in particular, a separation equipment, in particular a droplet separation equipment, which is provided for to receive the disposal medium discharged by the application apparatus and subject it to separation, in particular droplet separation. The droplet separator can, for example, be a droplet separator known according to the prior art which separates the droplets out of a gaseous medium.

The device is particularly able to agglomerate resp. separate off as large a proportion as possible of the droplets in order to remove them from the air or gas stream, and to do this advantageously without impairing the flow field in the area of the application apparatus.

In a preferred embodiment, a droplet separator is provided for, the on-stream surface of which is somewhat larger than the cross-sectional area arising of the (disposal medium) spray cone (for a distance from the application apparatus of e.g. about 200 mm to 400 mm this corresponds approximately to a circular on-stream surface with a diameter of about 300 mm to 700 mm, or a quadratic on-stream surface with a side length of about 300 mm to 700 mm). In order to maximize the proportion of the spray mist which is led through the droplet separator and/or to minimize diversion of flow of the separator, flow deflectors can be attached on the upstream side. These flow deflectors generate a dynamic component in the direction of the separator inlet. For example, the flow deflectors can initially be located in the extension of the outer walls of the droplet separator substantially parallel to the spray cone axis, wherein this guide plate can be redirected by about 90° to 120° inwards towards the central axis of the droplet separator after a run×(e.g. between about 100 mm and 200 mm). The length of this part after redirection can preferably be about 50 mm to 150 mm.

According to the invention the device can, in particular, comprise a receiving equipment which is provided for to receive the disposal medium and/or to discharge it. The disposal medium can, for example, be the disposal medium from an application apparatus and/or a disposal medium from a receiving apparatus for the application apparatus upstream of the receiving equipment.

It is furthermore possible that the device comprises a suction device which is provided for to suction and/or suction off at least a part of the disposal medium led to or into the receiving equipment.

Separation by means of a droplet separator is relatively ineffective, in particular in the case that an organic solvent is used as a rinsing resp. cleaning agent. The strong tendency of the medium to evaporate leads to a situation whereby a large proportion of the medium evaporates when spraying into the droplet separator or also into a hopper. One possibility to capture the rinsing agent and to avoid entry of organic emissions into the cabin air is to suction off the atomized solvent during the rinsing and/or cleaning process separately, preferably in the immediate vicinity of the application apparatus.

The application apparatus is preferably an atomizer, in particular a rotary atomizer. The application apparatus particularly emits an atomized disposal medium spray jet. It is preferable that the disposal medium spray jet emitted from the application apparatus is essentially conical and/or is essentially paraboloidal.

The disposal medium is usually a mixture of coating agent such as paint (e.g. a single-component paint or a two-component or multi-component paint), rinsing agent, cleaning agent, solvent and/or other media produced during cleaning and/or rinsing processes of application apparatuses. The disposal medium can, however also be essentially a pure coating agent (for example pure single component, two-component or multi-component paint) or essentially a pure rinsing or cleaning agent and/or solvent. The disposal medium is particularly an atomized disposal medium. The disposal medium is preferably fed in an atomized form (that is preferably as an atomized disposal medium spray jet) into the separation equipment and/or the receiving equipment or the cleaning device mentioned below for the application apparatus. The disposal medium may be non-atomized. The disposal medium is, in particular, emitted from the application apparatus as an atomized disposal medium spray jet. It is furthermore possible that the disposal medium is present as a disposal medium mist. The disposal medium can contain organic components, in particular organic solvent, or be an organic solvent.

The separation equipment can comprise a separator, in particular a droplet separator and/or flow conducting equipment (in particular with flow deflectors). The flow conducting equipment is preferably provided for in order to deflect the disposal medium emitted from the application apparatus to the droplet separator and/or in order to generate a dynamic component in the direction of the droplet separator. In an assembled condition resp. during a cleaning and/or rinsing process, the flow conducting equipment is preferably arranged coaxially over the droplet separator resp. on the upstream side of the droplet separator and connected with it. It is preferred that the droplet separator and the flow conducting equipment are fastened together or connectable together and in particular form a compact unit. The flow conducting equipment is, in particular, provided for to maximize the proportion of the (disposal medium) spray mist which is led through the separator, and/or to minimize diversion of flow of the separator.

It is possible that the flow conducting equipment has a first section which tapers towards the droplet separator. In particular during the cleanings and/or rinsing process of the application apparatus, the first section is facing the application apparatus resp. widens out towards the application apparatus. Furthermore the flow conducting equipment can, for example, preferably comprise an essentially parallel running second section as an extension of the outer wall of the droplet separator.

The first section and the second section of the flow conducting equipment preferably merge into each other or are a single or an integral part. For example the first section can be redirected inwards to the middle axis of the droplet separator and/or the flow conducting equipment by an angle of greater than approximately 90°, 100°, 110°, 120°, 130° or 140°, and/or less than about 95°, 105°, 115°, 125°, 135° or 145°. Furthermore the second section can have a length of greater than approximately 50 mm, 100 mm, 150 mm, 200 mm or 250 mm and/or smaller than about 75 mm, 125 mm, 175 mm, 225 mm or 275 mm, whereas the first section (after the redirection) can, for example, have a length of greater than approximately 25 mm, 75 mm, 125 mm, 175 mm or 225 mm, and/or less than about 50 mm, 100 mm, 150 mm, 200 mm or 250 mm.

The separation equipment is preferably provided for in order to receive the disposal medium discharged by the application apparatus and to subject it to impact separation, wherein the (droplet) separator is then designed as an impact separator. The impact separator can, for example, comprise a multiplicity of separating profiles through which the disposal medium is diverted a number of times and impacts against impact surfaces, wherein a film of disposal medium forms on the impact surfaces which preferably flows away downwards due to the force of gravity. The separating profiles can, for example, have downward facing forms in order to favor flowing off of the film and/or in order to avoid already separated droplets from being picked up again by the gas/air stream. The separation equipment is, in particular, designed for vertical loading from above.

It is possible that the on-stream surface of the flow conducting equipment and/or the droplet separator is dimensioned in such a way that the disposal medium spray jet can essentially be received in full from the application apparatus. The on-stream surface can, in particular, be at least slightly larger than the (preferably upon arrival at the on-stream surface) arising cross-sectional surface of the disposal medium spray jet (which will mostly be formed essentially conically and/or paraboloidal).

For example, it is possible that the separation equipment is arranged above a coating cabin floor, in particular above a passage formed in it. It is furthermore possible that the receiving equipment is arranged below the coating cabin floor, in particular below the passage formed in it. It is also possible that the separation equipment is arranged under the coating cabin floor. The coating cabin floor can, for example, be a grating. The coating cabin floor is preferably a coating cabin floor of a coating installation for motor vehicle bodies and/or their add-on parts.

It is in particular possible that the on-stream surface of the droplet separator is designed in such a way that a rebound of the disposal medium discharged from the application apparatus is reduced or avoided. To do this the free area of the droplet separator, in particular the free area of the on-stream surface, is appropriately large in order to avoid any rebound of the disposal medium.

The device preferably comprises a receiving equipment which is provided for in order to receive and/or discharge a disposal medium from the separation equipment which has undergone (droplet) separation. The outlet of the droplet separator is, in particular, provided for to lead the disposal medium which has undergone droplet separation into the inlet opening of the receiving equipment.

In one embodiment the receiving equipment is a funnel-shaped collection element, for example with an essentially circular, rectangular or quadratic cross-section, which, for example, has an inlet opening and an outlet opening for the disposal medium.

It is possible that the inlet opening and the outlet opening of the receiving equipment are the same opening, that is the disposal medium can be removed through the same opening through which it was transported over into the receiving equipment.

The separation equipment is preferably provided for in order, during the cleaning and/or rinsing process of the application apparatus resp. in a mounted condition of the device, to have an axial distance to the application apparatus, in particular its spray element (for example a nozzle, a bell cup, etc.), and an axial distance to the receiving equipment, in particular its inlet opening. The separation equipment is in particular provided for in order to preferably be arranged, spaced apart above the receiving equipment, preferably above the inlet opening of the receiving equipment.

During the cleaning and/or rinsing process of the application apparatus resp. in a mounted condition of the device, the separation equipment is in particular arranged essentially coaxially (spaced apart) above the receiving equipment, wherein the application apparatus resp. the spray element of the application apparatus (for example a nozzle, a bell cup, etc.) is preferably to be arranged essentially coaxially (spaced apart) above the droplet separating equipment.

The separation equipment, in particular the on-stream surface of the droplet separator, is preferably provided for in order have an axial distance from the application apparatus, in particular the spray element of the application apparatus (for example a nozzle, a bell cup, etc.), when the cleaning and/or rinsing process is performed or in the mounted condition of the device. Here the distance can be greater than approximately 100 mm, 200 mm, 300 mm, 400 mm, 500 mm or 600 mm and/or less than approximately 150 mm, 250 mm, 350 mm, 450 mm, 550 mm or 650 mm.

The droplet separator preferably has a height greater than approximately 75 mm, 125 mm, 175 mm, 225 mm, 275 mm or 325 mm and/or less than approximately 100 mm, 150 mm, 200 mm, 250 mm, 300 mm or 350 mm.

In a mounted condition of the device or during a rinsing and/or cleaning process it is, in particular, possible that
a) between the on-stream surface resp. the inlet of the droplet separator and the application apparatus (in particular the spray element), and/or
b) between the on-stream surface resp. the inlet of the flow conducting equipment and the application apparatus (in particular the spray element), and/or
c) between the outlet of the droplet separator and the inlet opening of the receiving equipment resp. between the receiving equipment and the separation equipment
a respective axial distance is formed which is greater than approximately 50 mm, 100 mm, 150 mm, 200 mm, 250 mm, 300 mm, 350 mm, 400 mm, 450 mm, 500 mm or 550 mm, and/or less than approximately 75 mm, 125 mm, 175 mm, 225 mm, 275 mm, 325 mm, 375 mm, 425 mm, 475 mm, 525 mm or 575 mm. The respective distances can be the same size or different size.

The flow conducting equipment and/or the droplet separator can comprise an inlet or an on-stream surface for the disposal medium discharged by the application apparatus, wherein the droplet separator can have an outlet for the disposal medium which has undergone droplet separation.

The receiving equipment can comprise a cylindrical and/or funnel-shaped first body, a cylindrical and/or funnel-shaped second body and/or a cylindrical and/or funnel-shaped third body, the respective cross-section of which can, for example, be circular, rectangular or quadratic.

The first body can, for example, have a length greater than approximately 200 mm, 250 mm, 300 mm, 350 mm, 400 mm, 450 mm or 500 mm and/or less than approximately 225 mm, 275 mm, 325 mm, 375 mm, 425 mm, 475 mm or 525 mm. The cylindrical first body preferably has a diameter of approximately 25 mm, 75 mm, 125 mm, 175 mm or 225 mm and/or less than approximately 50 mm, 100 mm, 150 mm, 200 mm or 250 mm.

The third body can, for example, have a diameter, in particular a maximum diameter for the funnel-shaped design, of greater than approximately 300 mm, 350 mm, 400 mm, 450 mm, 500 mm, 550 mm or 600 mm and/or less than approximately 325 mm, 375 mm, 425 mm, 475 mm, 525 mm, 575 mm or 625 mm.

The cylindrical part of the second body can have a length greater than approximately 250 mm, 300 mm, 350 mm, 400 mm, 450 mm, 500 mm, 550 mm or 600 mm and/or less than approximately 275 mm, 325 mm, 375 mm, 425 mm, 475 mm, 525 mm, 575 mm or 625 mm.

Furthermore, the receiving equipment can at least have one inlet opening in order to deliver the disposal medium, and/or at least one outlet opening in order to discharge the disposal medium.

It is possible that the at least one inlet opening is provided for in order to bring the disposal medium into the first body and/or the third body, and/or, in order to bring the disposal medium into an intermediate space between the first body and the third body. The outlet opening is preferably provided for in the second body in order to discharge the disposal medium, for example in a discharge line, which preferably leads the disposal medium into a collection tank.

The third body can have a larger diameter than the first body, wherein the second body can have at least partially a greater diameter than the first body and/or the third body.

The third body in turn can surround the first body at least partially in order to form an intermediate space between the third body and the first body. It is also possible that the second body at least partially surrounds the first body and/or the third body, for example in order to form an intermediate space between the second body and the first body and/or the third body. It is furthermore possible that the first body and the second body are spaced apart from each other to form an intermediate space between the first body and the second body.

The receiving equipment can, in particular, comprise a preferably circumferential annular gap, preferably formed by the first body and the third body. The annular gap can, for example, have a width greater than approximately 2.5 mm, 7.5 mm, 12.5 mm, 17.5 mm, 22.5 mm, 27.5 mm or 32.5 mm and/or less than approximately 5 mm, 10 mm, 15 mm, 20 mm, 25 mm, 30 mm or 35 mm. Here, in particular, the first body is cylindrical and the third body funnel-shaped, wherein the annular gap between the cylindrical first body and the preferably essentially smallest diameter of the third body (i.e. in a mounted condition of the device, the lowest section of the third body) is formed. It is possible that, through the annular gap, at least part of the disposal medium fed to or into the receiving equipment (in particular the third body) is led to the outlet opening of the receiving equipment and/or at least part of the disposal medium fed to or into the receiving equipment (in particular the third body) is suctioned resp. suctioned off (preferably downwards and/or to the side).

The receiving equipment, the at least one inlet opening of the receiving equipment, the outlet opening of the receiving equipment, the first body, the second body, the third body, the flow conducting equipment, the droplet separator and/or the application apparatus are preferably arranged essentially coaxially to each other during the cleaning and/or rinsing process of the application apparatus or in a mounted condition of the device.

The device can comprise a receiving part resp. a cleaning apparatus which is provided for to clean the application apparatus and/or receive the disposal medium discharged by the application apparatus and to deliver the disposal medium to the receiving equipment. The cleaning apparatus used can, in particular, be the cleaning apparatus disclosed in the document DE 10 2004 061 322 A1 and/or the cleaning device disclosed in the document DE 102 40 073 A1, the disclosures of which are fully incorporated in the current disclosure.

The suction device can have a suction throughput or an air volume flow of greater than approximately 5 m$^3$/h, 25 m$^3$/h, 75 m$^3$/h, 125 m$^3$/h, 175 m$^3$/h, 225 m$^3$/h or 275 m$^3$/h; and/or of less than approximately 50 m$^3$/h, 100 m$^3$/h, 150 m$^3$/h, 200 m$^3$/h, 250 m$^3$/h or 300 m$^3$/h.

The suction device can comprise a suction pipe. The receiving equipment can comprise a connection opening, preferably arranged on a side wall of the receiving equipment, in particular on the second body, with which the suction pipe is connectable. The suction pipe preferably opens out into the intermediate space between the first body and the second body, wherein the connection opening can stand fully or partially opposite to the side wall of the first body. The connection opening is preferably arranged between the at least one inlet opening and the outlet opening of the receiving equipment.

The suction pipe preferably has a diameter of about 25 mm, 75 mm, 125 mm, 175 mm or 225 mm and/or less than about 50 mm, 100 mm, 150 mm, 200 mm or 250 mm.

The suction device can have a suction removal section, including the suction pipe, which is provided with a particle separation means (for example one or more filters). This is advantageous since there can also be paint components present in the rinsing agent.

For the embodiment for which a receiving part resp. a cleaning apparatus is positioned upstream of the receiving equipment, it is possible that a section of an application apparatus to be cleaned (for example a spray head or a bell cup) is positioned in the cleaning apparatus and cleaned and/or the application apparatus discharges the disposal medium into the cleaning apparatus. The disposal medium which enters the cleaning apparatus can then be passed on to the receiving equipment.

According to the invention there is also a method for receiving or collecting and/or discharging or disposing of a disposal medium from cleaning and/or rinsing processes of an application apparatus, preferably performed using a device as described herein.

It is possible, for the method according to the invention, that the application apparatus discharges the disposal medium into a separation equipment, wherein the disposal medium is subjected to a separation in the separation equipment.

It is also possible for the method according to the invention that the disposal medium (for example from an application apparatus and/or a cleaning apparatus for the application apparatus) is discharged to or into a receiving equipment and a suction device suctions in and/or suctions off at least part of the disposal medium. It is particularly advantageous that the atomized disposal medium resp. the atomized solvent is suctioned and/or suctioned off during a rinsing and/or cleaning process, preferably in the immediate vicinity of the application apparatus. The disposal medium in particular comprises here organic components, preferably organic rinsing and/or cleaning agents, in particular organic solvents.

It is furthermore possible that, for the method according to the invention, the disposal medium discharged by the application apparatus is subjected to an electrostatic voltage charge during the cleaning and/or rinsing process and is discharged into a receiving equipment. This process is less effective for a rinsing process without a high voltage since only a small part of the rinsing fluid droplets remains in the receiving equipment due to the missing electrostatic separation effect. The major part of the liquid is mostly led with the usually provided guiding air, including the injected cabin air, in recoil out of the receiving equipment into the exhaust air.

It is possible that the application apparatus is positioned above, preferably spaced apart above, the receiving equipment. It is furthermore possible that the application apparatus delivers the disposal medium into the receiving equipment, in particular into the first body resp. an inner pipe, and/or that the application apparatus is positioned, at least partially, in the receiving equipment, in particular in the first body or the inner pipe. The application apparatus is preferably an atomizer, wherein its bell cup is positioned in the receiving equipment, in particular in the first body.

The disposal medium which is preferably atomized and/or can be an organic cleaning/rinsing agent or at least one containing organic components (preferably a solvent), can at least in part be agglomerated in the receiving equipment.

It is possible that the liquid part or the liquid phase of the disposal medium is discharged (for example through an inner pipe or the first body) essentially downwards (for example to the outlet opening of the receiving equipment). It is furthermore possible that the gaseous part or the gas phase of the disposal medium is suctioned off by the suction device, essentially to the side.

The application apparatus can, in particular, be cleaned in a receiving part resp. cleaning apparatus upstream of the receiving equipment, wherein it is also possible that the application apparatus delivers the disposal medium into the receiving part resp. cleaning apparatus. It is possible that the cleaning apparatus is preferably positioned spaced apart above the receiving equipment.

It is possible that preferably atomized disposal medium (for example an atomized preferably organic solvent) is led from the cleaning apparatus to or into the receiving equipment, in particular the third body.

The liquid part or the liquid phase of the disposal medium is preferably fed to a funnel-shaped (for example the third body) of the receiving equipment and/or led via an annular gap (for example between the first body and the third body) in the receiving equipment to the outlet opening of the receiving equipment.

It is possible that atomized and/or non-atomized disposal medium (for example an atomized preferably organic solvent) discharged from the cleaning apparatus is suctioned downwards by means of the suction device and/or is at least partially suctioned and/or suctioned off to the side.

Further method steps arise directly from the description of the device, in particular from the functionality of the device.

According to the invention there is also a disposal system for disposal medium provided for, in particular, for disposal medium from cleaning and/or rinsing processes of an application apparatus, which comprises a device as disclosed herein. The disposal system can also, for example, comprise a discharge line which is provided for in order to remove the disposal medium from the receiving equipment, preferably to a collection tank.

The disposal system is, in particular, a disposal system for a coating installation (for example a painting plant) for vehicles, preferably motor vehicle body parts.

The receiving equipment can essentially be positioned below a grating and/or below a grating level of the disposal system, preferably within range of a painting robot.

It is possible that part of the receiving equipment, in particular of the first body, is arranged in the grating and/or projects out over the grating resp. is led through this, wherefore the grating can have a suitably provided opening. The grating can, in particular, have an opening which is provided in such a way that at least one inlet opening of the receiving equipment is exposed in order to be able to arrange the application apparatus at least partially in the opening of the grating and/or the inlet opening and/or the receiving equipment.

Furthermore, the second body and/or the third body can be arranged under the grating.

It is, however, also possible that the application apparatus leads the disposal medium through the grating as such into the receiving equipment.

The grating can also have any different kind of bottom design within the framework of the invention, which bottom design expediently has a passage in it, in particular a coating cabin bottom of a coating installation for motor vehicle bodies and/or their add-on parts.

Using the device according to the invention it is possible to simply collect the disposal medium in an advantageous manner and/or be discharged or disposed of, in order to avoid emissions and build up of puddles. It is furthermore possible that, in particular an organic disposal medium, in particular an atomized organic disposal medium mist, can be collected in order for this, as necessary, not to first dilute through the cabin air but rather to be led in a targeted way separately for afterburning.

Figure 1B:
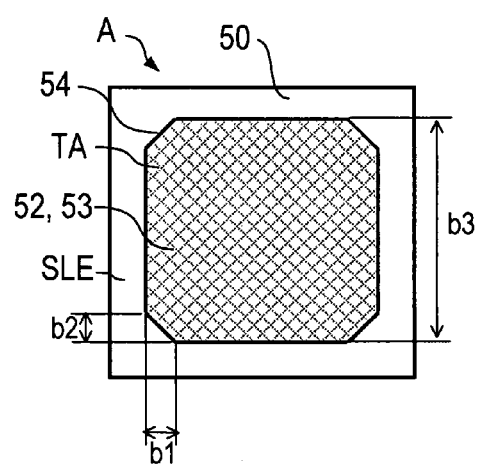
Figure 4:
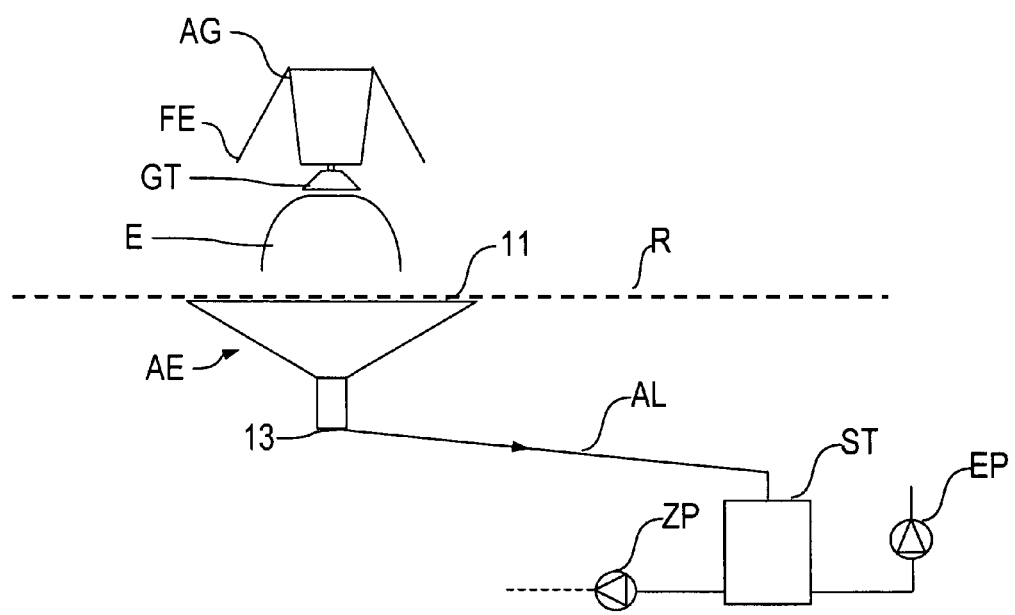
Figure 5:
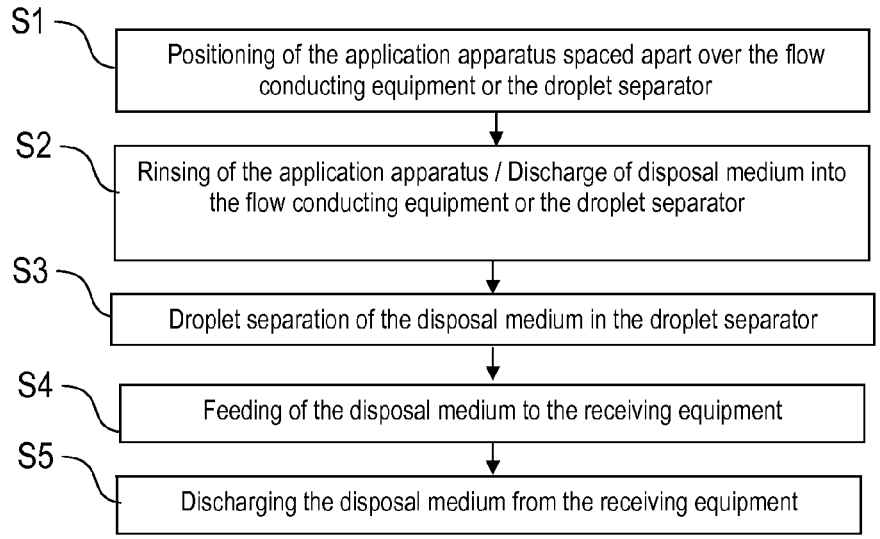
Figure 6:
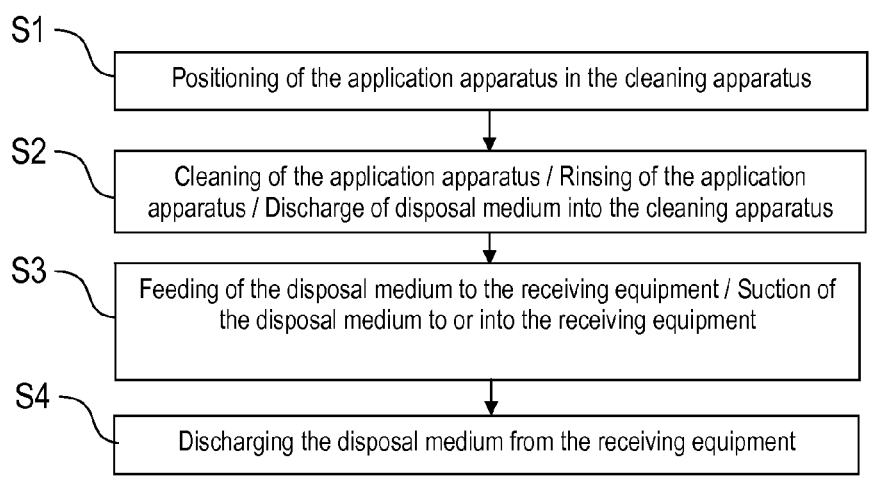
Figure 7:
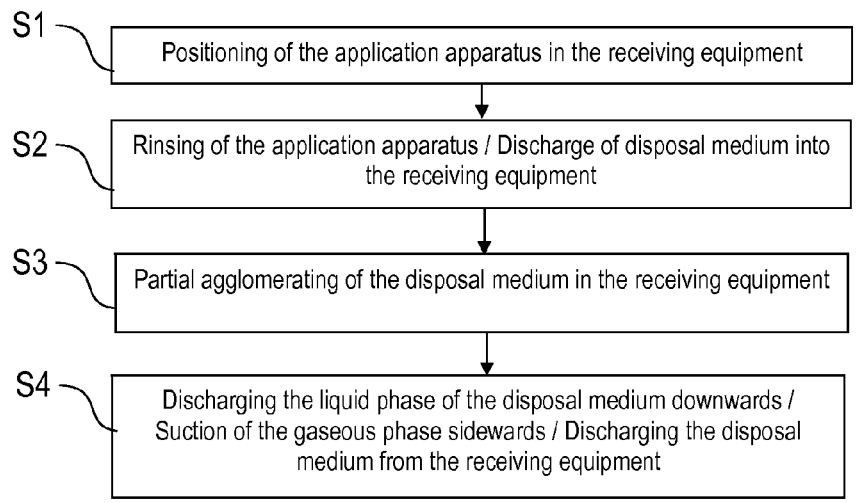
Figure 8:
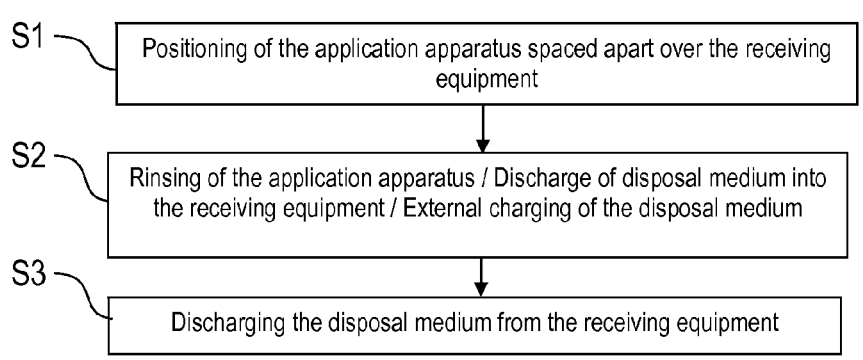
Figure 9:
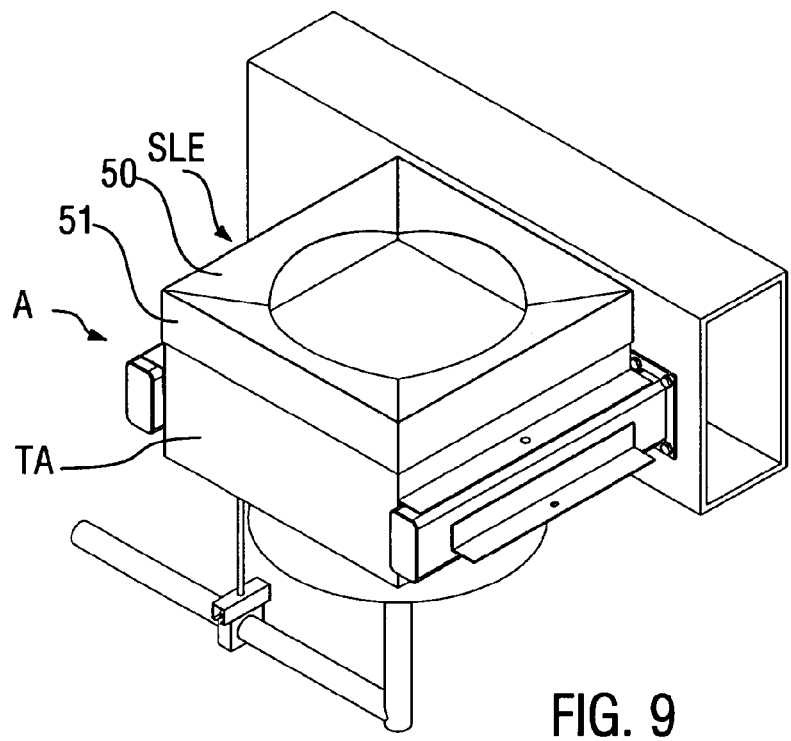

Other advantageous further developments of the invention are identified in the subclaims or are explained in greater detail below with reference to the figures together with the description of the preferred exemplary embodiments of the invention. The figures show as follows:

FIG. 1a a device in accordance with a first exemplary embodiment of the invention;

FIG. 1b a top view of a flow conducting equipment and a droplet separator according to FIG. 1a;

FIG. 2 a device according to a second exemplary embodiment of the invention, for which the disposal medium is led by means of an exemplary method according to the invention into and/or out of the receiving equipment;

FIG. 3 a device according to FIG. 2 for which the disposal medium is led by another exemplary method according to the invention into and/or out of the receiving equipment;

FIG. 4 a part of a disposal system and an application apparatus during a cleaning and/or rinsing process in accordance with an exemplary embodiment of the invention, wherein the disposal medium is led by means of in turn other exemplary method according to the invention to and/or into the receiving equipment; and FIG. 5 a flow diagram of a method, which can be executed with the device according to FIG. 1a;

FIG. 6 a flow diagram of a method, which can be executed with the device according to FIG. 2;

FIG. 7 a flow diagram of another method, which can be executed with the device according to FIG. 2 or FIG. 3;

FIG. 8 a flow diagram of yet another method, which can be executed with a device according to FIG. 4;

FIG. 9 a perspective view from above of the device shown in FIGS. 1a, 1b; and

Figure 10:
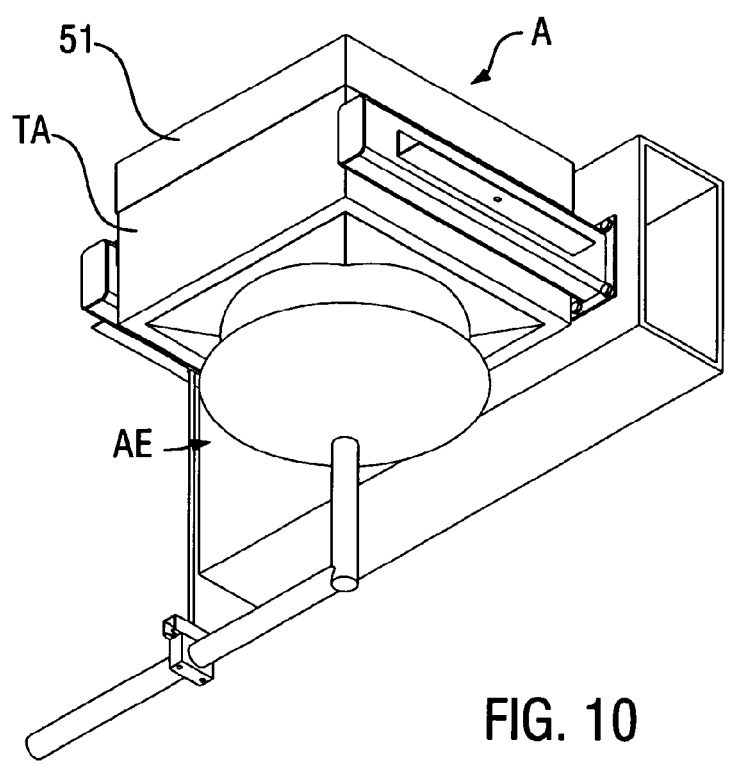

FIG. 10 a perspective bottom view of the device shown in FIGS. 1a, 1b.

FIG. 1a shows a device provided for receiving and/or disposing of a disposal medium E from cleaning and/or rinsing processes of an application apparatus AG in a mounted condition or during a cleaning and/or rinsing process. The device comprises a separation equipment A which is provided for in order to receive the disposal medium E discharged by the application apparatus AG and to subject it to a separation. The application apparatus AG is a rotary atomizer which has a bell cup GT as a spray element. The separation equipment A comprises a droplet separator TA provided for in order to receive the disposal medium E discharged by the application apparatus AG and to subject it to a droplet separation. The droplet separator TA is preferably an impact separator. The separation equipment A further comprises a flow conducting equipment SLE which is provided for in order to deflect the disposal medium E emitted from the application apparatus AG to the droplet separator TA and/or in order to generate a dynamic component in the direction of the droplet separator TA.

Furthermore, the device shown in FIG. 1a comprises a receiving equipment AE which is provided for as a collection hopper (for example with a circular or quadratic cross-section) in order to receive and remove disposal medium E subjected to a separation by the separation equipment A, in particular the droplet separator TA. The receiving equipment AE has an inlet opening 11 for the disposal medium E and an outlet opening 13 for the disposal medium E in order to preferably lead the disposal medium E via a discharge line, for example to a collection tank (not shown in FIG. 1a). The separation equipment A is preferably arranged on a grating not shown in FIG. 1a while the receiving equipment AE is arranged under the grating.

The flow conducting equipment SLE shown in FIG. 1a has a first section 50 tapering to the droplet separator TA and a second section 51 in the extension of the outer wall of the droplet separator TA running essentially parallel. The on-stream surface 52 of the flow conducting equipment SLE and/or the on-stream surface 53 of the droplet separator TA is dimensioned in order to receive the disposal medium spray jet essentially completely, and is in particular formed essentially quadratic or polygonal. The on-stream surface 53 of the droplet separator TA is in particular designed in such a way that a rebound of the disposal medium E emitted from the application apparatus AG is reduced or avoided.

The droplet separator TA preferably has a height 13 of about 170 mm. The flow conducting equipment SLE preferably has a height 12 of about 150 mm. The first section preferably has a length 16 of between about 50 mm to 60 mm.

In a mounted condition of the device resp. during a rinsing and/or cleaning process it is, in particular, possible that a) the axial distance 15 between the on-stream surface or the inlet 53 of the droplet separator TA and the application apparatus AG (in particular the spray element which is preferably a bell cup GT) is approximately between 230 mm and 400 mm; and/or b) the axial distance 11 between the on-stream surface resp. the inlet 52 of the flow conducting equipment SLE and the application apparatus AG (in particular the spray element which is preferably a bell cup GT) is approximately between 80 mm and 250 mm; and/or c) the axial distance 14 between the outlet 54 of the droplet separator TA and the inlet opening 11 of the receiving equipment AE is about 250 mm.

FIG. 1b shows a view from above of the separation equipment A according to FIG. 1a and in particular of the flow conducting equipment SLE and the droplet separator TA.

The flow conducting equipment SLE resp. the first section 50 can have beveled edges 54 inside which can respectively extend over a first width b1 and a second width b2. The first width b1 preferably matches the second width b2 and can be greater than approximately 30 mm, 40 mm, 50 mm, 60 mm, 70 mm, 80 mm or 90 mm and/or less than approximately 35 mm, 45 mm, 55 mm, 65 mm, 75 mm, 85 mm or 95 mm, in particularly about 55 mm for a view from above of the flow conducting equipment SLE.

The on-stream surface 53 of the droplet separator TA and/or the on-stream surface 52 of the flow conducting equipment SLE is somewhat greater than the arising cross-sectional surface of the disposal medium spray jet, which is preferably in the form of a spray cone, during impact on the respective on-stream surface 52 and/or 53. For an axial distance 15 of approximately 200 mm to 400 mm this roughly represents a circular on-stream surface with a diameter of approximately 300 mm to 700 mm or, for example, a quadratic on-stream surface with a width b3 of approximately 300 mm to 700 mm.

FIG. 5 shows a flow diagram of a method which can be executed with the device according to FIG. 1a; In a step S1 the application apparatus AG is arranged spaced apart above the flow conducting equipment SLE resp. spaced apart above the droplet separator TA. In a second step S2 the application apparatus AG is rinsed resp. the disposal medium E is passed on to the flow conducting equipment SLE resp. the droplet separator TA. In a third step S3 the disposal medium E fed to the droplet separator TA is subjected to droplet separation. In a fourth step S4 the disposal medium E is discharged from the droplet separator TA to the receiving equipment AE, and then from there in step S5 is sent, for example, via a disposal pipe to a collection tank.

FIG. 2 shows a device for receiving and/or disposing of a disposal medium from cleaning and/or rinsing processes of an application apparatus according to a second exemplary embodiment of the invention. The parts of the second exemplary embodiment which are identical or similar to the parts of the first exemplary embodiment are awarded the same reference numerals, wherein reference is made to the description of the first exemplary embodiment for an explanation about them.

The device comprises a receiving equipment AE which is provided for in order to receive a disposal medium E from an application apparatus AG and/or from a cleaning apparatus BC arranged upstream of the receiving equipment AE. The cleaning apparatus BC is provided for to clean the application apparatus AG using a cleaning agent which represents a disposal medium E and/or to receive the disposal medium E discharged by the application apparatus AG and then to pass on the disposal medium E to or into the receiving equipment AE. The disposal medium E can thus be a rinsing agent which is discharged by the application apparatus AG and/or a cleaning agent which is discharged by the cleaning apparatus BC.

Furthermore, the device comprises a suction device SE which is provided for in order to suction resp. suction off at least part of the disposal medium E led to or into the receiving equipment AE and/or discharged by the cleaning apparatus BC.

The receiving equipment AE comprises a cylindrical first body 10 which preferably is an inner pipe, a cylindrical and/or funnel-shaped second body 20 and a funnel-shaped third body 30. The receiving equipment AE can have at least one inlet opening 11 in order to bring in the disposal medium E and at least one outlet opening 13 in order to lead the disposal medium E, preferably via a discharge line, for example, to a collection tank (not shown in FIG. 2). The inlet opening 11 is provided for in order to bring the disposal medium E into the first body 10, but in particular to or into the third body 30 or into an intermediate space between the first body 10 and the third body 30.

The third body 30 has a larger diameter than the first body 10. The second body 20 has, at least partially, a larger diameter than the first body 10 and/or the third body 30. The third body 30 surrounds the first body 10 at least partially in order to form an intermediate space between the third body 30 and the first body 10. The second body 20 surrounds the first body 10 (and the third body 30) at least partially in order to form an intermediate space between the second body 20 and the first body 10 (and the third 30). The first body 10 and the second body 20 are spaced apart from each other to form an intermediate space between the first body 10 and the second body 20.

The receiving equipment AE in particular has a circumferential annular gap RS through which the disposal medium E can be led to the outlet opening 13 of the receiving equipment AE and/or through which the disposal medium E can be suctioned resp. suctioned off downwards and/or to the side. The annular gap RS is formed between the first body 10 and the third body 30. In particular, the annular gap RS is formed between the cylindrical first body 10 and the preferably essentially smallest diameter of the funnel-shaped third body 30 (that is in a mounted condition of the device resp. during a cleaning and/or rinsing process the lowest section of the third body 30). The annular gap RS has a width of between about 10 mm and about 20 mm.

The receiving equipment AE is essentially positioned below a grating R and/or below a grating level, preferably within range of a painting robot. One part of the receiving equipment AE, namely an upper section of the first body 10, is arranged in an opening in the grating R or projects through and over the grating R. The opening in the grating R is in particular provided so that at least the inlet opening 11 of the receiving equipment AE is exposed in order to be able to arrange the application apparatus AG (in particular its spray element, for example the bell cup GT) at least partially in the opening of the grating R, in the inlet opening 11 and/or the receiving equipment AE.

The suction device SE comprises a suction pipe AR and a suction removal section which has a particle separation means. The receiving equipment AE comprises a connection opening Ö, in particular arranged on a side wall of the receiving equipment AE and/or the second body 20, with which the suction pipe AR is connected. The suction pipe AR opens out into the intermediate space between the first body 10 and the second body 20. The connection opening Ö stands fully opposite to the side wall of the first body 10 and is arranged between the inlet opening 11 and the outlet opening 13 of the receiving equipment AE.

FIG. 6 shows a flow diagram of a method according to the invention which can be executed with the device according to FIG. 2. In a step S1 the application apparatus AG can at least partially be arranged in the cleaning apparatus BC upstream of the receiving equipment AE. In a step S2 the application apparatus AG can be cleaned by the cleaning apparatus BC and/or the application apparatus AG can discharge the disposal medium E out of its rinsing process into the cleaning apparatus BC. In a step S3 the (atomized and/or non-atomized) disposal medium E passes from the cleaning apparatus BC to or into the receiving equipment AE, in particular to or into the third body 30. The (atomized and/or non-atomized) disposal medium E emitted by the cleaning apparatus BC is preferably simultaneously to step S3 suctioned or suctioned off downwards and/or at least in part to the side by means of the suction device. The liquid part or the liquid phase of the disposal medium E is in particular fed to the funnel-shaped third body 30 and passes over the annular gap RS to the outlet opening 13 of the receiving equipment AE. In a fourth step S4 the disposal medium E is discharged from the receiving equipment AE and for example, led via a disposal pipe to a collection tank. The disposal medium E comprises organic components, in particular organic solvent.

FIG. 3 shows a device which corresponds to the device according to FIG. 2 so that the same reference numerals are used for the same parts and reference is made to the description of the previous exemplary embodiment for an explanation about them. FIG. 3 in particular shows that an upper section of the first body 10 is led through an opening in the grating R or exposed in such a way that the bell cup GT of the application apparatus AG can be arranged in the inlet opening 11 or the first body 10 in order to discharge the disposal medium E in it. FIG. 7 shows a flow diagram of a method according to the invention which can be executed with the device according to FIG. 3. In a first step S1 the application apparatus AG is at least partially arranged (for example with the spray element, in particular the bell cup GT) in the receiving equipment AE, preferably in the first body 10 and/or the inlet opening 11. In a second step S2 the application apparatus AG is rinsed resp. delivers the disposal medium E into the receiving equipment AE, in particular the first body 10. In a third step S3 the preferably atomized disposal medium E is at least in part agglomerated in the receiving equipment AE. In a fourth step S4 the liquid part of the disposal medium E is removed (by means of the first body 10) downwards and the essentially gaseous part of the disposal medium E is suctioned resp. suctioned off downwards and/or at least in part to the side by means of the suction device SE. The disposal medium E comprises organic components, in particular organic solvent.

FIG. 4 shows a representation of an application apparatus AG during a cleaning/rinsing process and part of a disposal system according to an exemplary embodiment of the invention. The parts of the exemplary embodiment according to FIG. 4 which are identical or similar to the parts of the previous exemplary embodiments are awarded the same reference numerals, wherein reference is made to the description of the previous exemplary embodiments for an explanation about them.

The application apparatus AG is an atomizer, for example a rotary atomizer which has a bell cup GT as an spray element and which comprises a system for electrostatic charging of a coating and/or disposal medium E, preferably with a high voltage, in particular for external charging by means of a plurality of external electrodes (for example a plurality of finger electrodes FE or an electrode ring which comprises a plurality of electrodes, wherein the electrodes are preferably evenly arranged around the application apparatus AG). The electrodes are preferably high voltage electrodes. The outer charging is known according to the prior art for rotary atomizers for coating purposes. The receiving equipment AE is arranged under a grating R.

For the exemplary embodiment of the invention shown in FIG. 4 the cleaning and/or rinsing process is performed for an electrostatically supported output under a high voltage. Here, analog to the coating process with a coating agent, preferably paint, in this case the disposal medium E, that is a cleaning agent and/or rinsing agent (with or without paint residues) is separated at the inner surfaces of the receiving equipment AE and discharged in a targeted manner.

In FIG. 4 there is furthermore a part of a disposal system schematically shown which can also be used for the devices described above. The receiving equipment AE, in particular the outlet opening 13, is connected to a discharge line AL which is preferably sloped and which leads the disposal medium E into a collection tank ST. The discharge line AL preferably runs essentially parallel to a painting line and can be coupled to one or more receiving equipments. The disposal system can furthermore have a circulation pump ZP in order to transport the disposal medium E out of the collection tank ST, preferably continuously, for example to the starting point of the discharge line AL, whereby any deposition of the disposal medium E in the discharge line AL or the collection tank ST can be reduced or avoided. As soon as the collection tank ST is full, the collection tank ST can either be conducted with the aid of an optional disposal pump EP into a further transport reservoir or emptied into a transport container.

FIG. 8 shows a flow diagram of a method which can be executed with the device according to FIG. 4; In a first step S1 the application apparatus AG is positioned, spaced apart, above the receiving equipment AE. In a second step S2 the application apparatus AG is rinsed out resp. the application apparatus AG discharges the disposal medium E into the receiving equipment AE, in particular into a funnel-shaped collection element, wherein the discharged disposal medium E is charged with a high voltage by means of the finger electrodes FE. In a third step S3 the disposal medium E is discharged from the receiving equipment AE and for example, led via a disposal pipe to a collection tank.

FIG. 9 shows a perspective view from above and FIG. 10 a perspective bottom view of the device according to FIGS. 1a and 1b. The device is preferably used in a painting cabin under a grating not shown in FIGS. 9 and 10. The droplet separator TA is housed in a housing including an outer wall. FIG. 9 particularly shows the first section 50 of the flow conducting equipment SLE which tapers towards the droplet separator TA and the second section 51 of the flow conducting equipment SLE formed in the extension of the outer wall of the droplet separator TA. Due to spatial limitation in the inflow area of the droplet separator TA by the first section 50 (upwards) and the second section 51 (to the side) a virtually full through flow can be achieved and therefore advantageously a high effectiveness of the droplet separator TA.

The invention is not limited to the preferred exemplary embodiments described above. Instead, a plurality of variants and modifications are possible, which also make use of the concept of the invention and thus fall within the scope of protection. The invention, in particular, also claims protection for the subject-matter of the sub-claims independently of the subject-matter of the prior claims referred to.

The invention claimed is:
1. A device, comprising:
 a separation equipment provided to receive a disposal medium discharged by an application apparatus, the separation equipment being configured to separate droplets of the disposal medium from gas of the disposal medium; and
 a receiving equipment provided to receive each of the disposal medium and a suction device, the suction device being provided to suction at least a part of the disposal medium to the receiving equipment;
 wherein the separation equipment is positioned directly above the receiving equipment; and wherein the separation equipment is arranged directly above a coating cabin floor of a coating installation and the receiving equipment is arranged below the coating cabin floor.

2. The device according to claim 1,
wherein the separation equipment comprises a droplet separator provided to receive the disposal medium discharged by the application apparatus the droplet separator being configured to separate the droplets from the gas; and
further wherein the separation equipment comprises a flow conducting equipment which is provided to at least one of deflect the disposal medium discharged from the application apparatus to the droplet separator and generate a dynamic component in the direction of the droplet separator.

3. The device according to claim 2, wherein the flow conducting equipment has a first section tapering towards the droplet separator, and an essentially parallel running second section in an extension of the outer wall of the droplet separator.

4. The device according to claim 1, wherein the separation equipment is provided to receive the disposal medium discharged by the application apparatus and to subject the discharge medium to an impact separation.

5. The device according to claim 1, wherein the receiving equipment is provided to discharge the disposal medium from the separation equipment after the disposal medium has undergone a separation.

6. The device according to claim 1, wherein the receiving equipment comprises:
a funnel-shaped first body;
a cylindrical or funnel-shaped second body; and
a cylindrical or funnel-shaped third body.

7. The device according to claim 6, wherein:
the receiving equipment has at least one inlet opening to accept the disposal medium and at least one outlet opening to discharge the disposal medium;
the at least one inlet opening is provided to introduce the disposal medium into at least one of the first body and the third body; and
the outlet opening is provided on the second body to discharge the disposal medium into a discharge line.

8. The device according to claim 7, wherein:
the third body has a larger diameter than the first body;
the second body has at least partially a larger diameter than each of the first body and the third body; and
the third body at least partially surrounds the first body thereby forming an intermediate space between the third body and the first body.

9. The device according to claim 8, wherein:
the second body at least partially surrounds the first body and the third body thereby forming intermediate spaces between the second body and the first body and the second body and the third body; and
the first body and the second body are spaced apart from each other thereby forming an intermediate space between the first body and the second body.

10. The device according to claim 6, wherein the receiving equipment comprises an annular gap through which the disposal medium can be conducted to an outlet opening of the receiving equipment, wherein the annular gap is formed between the first body and the third body.

11. The device according to claim 10, wherein the annular gap has a width greater than approximately 2.5 mm; 7.5 mm; 12.5 mm; 17.5 mm; 22.5 mm; 27.5 mm or 32.5 mm, and less than approximately 5 mm, 10 mm, 15 mm, 20 mm, 25 mm, 30 mm or 35 mm.

12. The device according to claim 1, wherein the suction device is a suction pipe, and the receiving equipment comprises a connection opening, arranged at a sidewall of the receiving equipment, with which the suction device can be connected.

13. The device according to claim 12, wherein the connection opening is at least partially located in front of the sidewall of the first body and arranged between an inlet opening and an outlet opening of the receiving equipment, and further wherein the suction pipe opens out into an intermediate space between the first body and the third body.

14. The device according to claim 1, wherein the suction device comprises a suction removal section that includes a particle separator.

15. A disposal system for a disposal medium, comprising:
a device including:
a separation equipment provided to receive a disposal medium discharged by an application the separation equipment being configured to separate droplets of the disposal medium from gas of the disposal medium; and
a receiving equipment provided to receive each of the disposal medium and a suction device, the suction device being provided to suction at least a part of the disposal medium to the receiving equipment;
wherein the separation equipment is positioned directly above the receiving equipment; and wherein the separation equipment is arranged directly above a coating cabin floor of a coating installation and the receiving equipment is arranged below the coating cabin floor;
a discharge line which is provided to remove the disposal medium from the receiving equipment.

16. The disposal system according to claim 15, wherein the receiving equipment is positioned directly below a grating or directly below a grating level of the disposal system and within range of a painting robot.

17. The disposal system according to claim 16, wherein part of the receiving equipment is arranged in the grating.

18. The disposal system according to claim 17, wherein the grating has an opening such that at least one inlet opening of the receiving equipment is exposed whereby the application apparatus can be positioned at least partially in the inlet opening.

* * * * *